United States Patent
Imamori et al.

(10) Patent No.: US 12,503,992 B2
(45) Date of Patent: Dec. 23, 2025

(54) INTERNAL COMBUSTION ENGINE

(71) Applicant: MITSUBISHI HEAVY INDUSTRIES ENGINE & TURBOCHARGER, LTD., Sagamihara (JP)

(72) Inventors: Yusuke Imamori, Tokyo (JP); Satoru Murata, Tokyo (JP); Kazutoshi Nomura, Tokyo (JP); Hiroyuki Endo, Sagamihara (JP); Sota Watanabe, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/840,864

(22) PCT Filed: Feb. 10, 2023

(86) PCT No.: PCT/JP2023/004547
§ 371 (c)(1),
(2) Date: Aug. 22, 2024

(87) PCT Pub. No.: WO2023/162720
PCT Pub. Date: Aug. 31, 2023

(65) Prior Publication Data
US 2025/0163879 A1    May 22, 2025

(30) Foreign Application Priority Data
Feb. 28, 2022   (JP) .................. 2022-029362

(51) Int. Cl.
*F02P 5/15*   (2006.01)
*F02D 19/02*   (2006.01)

(52) U.S. Cl.
CPC ............. *F02P 5/15* (2013.01); *F02D 19/02* (2013.01)

(58) Field of Classification Search
CPC .... F02P 5/15; F02P 5/145; F02P 15/08; F02P 11/02; F02D 19/02; F02D 35/023;
(Continued)

(56) References Cited

U.S. PATENT DOCUMENTS

| | | | |
|---|---|---|---|
| 5,495,757 A | | 3/1996 | Atanasyan et al. |
| 5,713,338 A | * | 2/1998 | Wheeler ............... F02P 15/008 |
| | | | 123/647 |

(Continued)

FOREIGN PATENT DOCUMENTS

| | | | | |
|---|---|---|---|---|
| DE | 10057076 B4 | * | 4/2015 | ............. F02P 3/053 |
| EP | 2837816 A1 | * | 2/2015 | ........... F02N 99/008 |

(Continued)

OTHER PUBLICATIONS

International Preliminary Report on Patentability and Written Opinion of the International Searching Authority for International Application No. PCT/JP2023/004547, dated Aug. 30, 2024, with an English translation.

(Continued)

*Primary Examiner* — Hung Q Nguyen
(74) *Attorney, Agent, or Firm* — Birch, Stewart, Kolasch & Birch, LLP

(57) ABSTRACT

An internal combustion engine includes: a combustion chamber to which a gas fuel containing hydrogen is supplied; an ignition device configured to ignite the gas fuel within the combustion chamber; and a control device for controlling execution of an ignition operation of the ignition device at a predetermined ignition timing. The predetermined ignition timing includes a first-time ignition timing of one combustion cycle, at which the ignition operation is executed for a first time, and a subsequent ignition timing of the one combustion cycle, at which the ignition operation is executed subsequent to the first-time ignition timing.

7 Claims, 5 Drawing Sheets

(58) Field of Classification Search
CPC ............ F02D 37/02; F02D 2200/1015; F02D 41/0027; F01N 2430/08; F01N 3/00; Y02T 10/30
See application file for complete search history.

(56) References Cited

U.S. PATENT DOCUMENTS

| | | | | |
|---|---|---|---|---|
| 6,694,959 | B1* | 2/2004 | Miwa | F02P 15/08 123/636 |
| 7,096,853 | B2* | 8/2006 | Tomita | F02D 37/02 123/406.47 |
| 2001/0017125 | A1* | 8/2001 | Matsubara | F02P 15/08 123/638 |
| 2006/0065235 | A1* | 3/2006 | Tomita | F02D 41/401 123/406.47 |
| 2007/0131188 | A1* | 6/2007 | Hokuto | F02B 17/005 123/431 |
| 2009/0012698 | A1 | 1/2009 | Shinagawa et al. | |
| 2009/0084353 | A1* | 4/2009 | Inada | F02P 5/1455 123/406.12 |
| 2010/0057324 | A1* | 3/2010 | Glugla | F02P 17/12 701/111 |
| 2011/0144881 | A1* | 6/2011 | Glugla | F02P 15/08 701/102 |
| 2014/0214306 | A1* | 7/2014 | Badillo | F02D 41/1446 701/104 |
| 2014/0257674 | A1* | 9/2014 | Assaf | F02D 19/0623 701/104 |
| 2014/0345565 | A1 | 11/2014 | Mori | |
| 2015/0075487 | A1 | 3/2015 | Glugla et al. | |
| 2018/0163687 | A1* | 6/2018 | Tanaka | F02D 41/3023 |

FOREIGN PATENT DOCUMENTS

| | | | |
|---|---|---|---|
| JP | 61-34358 A | 2/1986 | |
| JP | 3743607 B2 * | 2/2006 | ......... F02D 41/1498 |
| JP | 2007-198273 A | 8/2007 | |
| JP | 2008-151149 A | 7/2008 | |
| JP | 2010-196673 A | 9/2010 | |
| JP | 2012-31766 A | 2/2012 | |
| WO | WO 2013/038530 A1 | 3/2013 | |

OTHER PUBLICATIONS

International Search Report for International Application No. PCT/JP2023/004547, dated Mar. 28, 2023, with English translation.
Partial Supplementary European Search Report for European Application No. 23759724.0, dated Mar. 13, 2025.

* cited by examiner

INTERNAL COMBUSTION ENGINE

TECHNICAL FIELD

The present disclosure relates to an internal combustion engine.

This application claims the priority of Japanese Patent Application No. 2022-029362 filed on Feb. 28, 2022, the content of which is incorporated herein by reference.

BACKGROUND

In an internal combustion engine such as a gas engine, when a phenomenon (so-called a misfire) occurs in which gas fuel within a combustion chamber does not burn, the unburned gas fuel is discharged from the combustion chamber, and the unburned gas fuel may flow through an exhaust system. Patent Document 1 discloses a misfire detection device for determining a misfire of an internal combustion engine based on a variation in in-cylinder pressure of a plurality of combustion cycles.

CITATION LIST

Patent Literature

Patent Document 1: JP2012-031766A

SUMMARY

Technical Problem

Meanwhile, hydrogen has a higher combustion speed than a component contained in conventional gas fuel (such as methane contained in city gas or propane contained in LPG). Therefore, if the gas fuel contains hydrogen, even the unburned gas fuel discharged from the combustion chamber due to the occurrence of the misfire in one combustion cycle may ignite in the exhaust system. If the unburned gas fuel ignites in the exhaust system, the exhaust system may be damaged by a sudden pressure increase, or an intake system may be damaged by a backflow of flame into the intake system during an overlap period when an exhaust stroke and an intake stroke overlap.

The present disclosure was made in view of the above, and an object of the present disclosure is to provide an internal combustion engine that adopts the gas fuel containing hydrogen and is capable of suppressing the damage due to the occurrence of the misfire in the one combustion cycle.

Solution to Problem

In order to achieve the above object, an internal combustion engine according to the present disclosure, includes: a combustion chamber to which a gas fuel containing hydrogen is supplied; an ignition device configured to ignite the gas fuel within the combustion chamber; and a control device for controlling execution of an ignition operation of the ignition device at a predetermined ignition timing. The predetermined ignition timing includes a first-time ignition timing of one combustion cycle, at which the ignition operation is executed for a first time, and a subsequent ignition timing of the one combustion cycle, at which the ignition operation is executed subsequent to the first-time ignition timing.

Advantageous Effects

According to an internal combustion engine of the present disclosure, gas fuel containing hydrogen is adopted, making it possible to suppress damage due to occurrence of a misfire in one combustion cycle.

DETAILED DESCRIPTION

Hereinafter, an internal combustion engine according to embodiments of the present disclosure will be described with reference to the drawings. The embodiments each indicate one aspect of the present disclosure, do not intend to limit the disclosure, and can optionally be modified within a scope of a technical idea of the present disclosure.

First Embodiment (Configuration)

Figure 1:
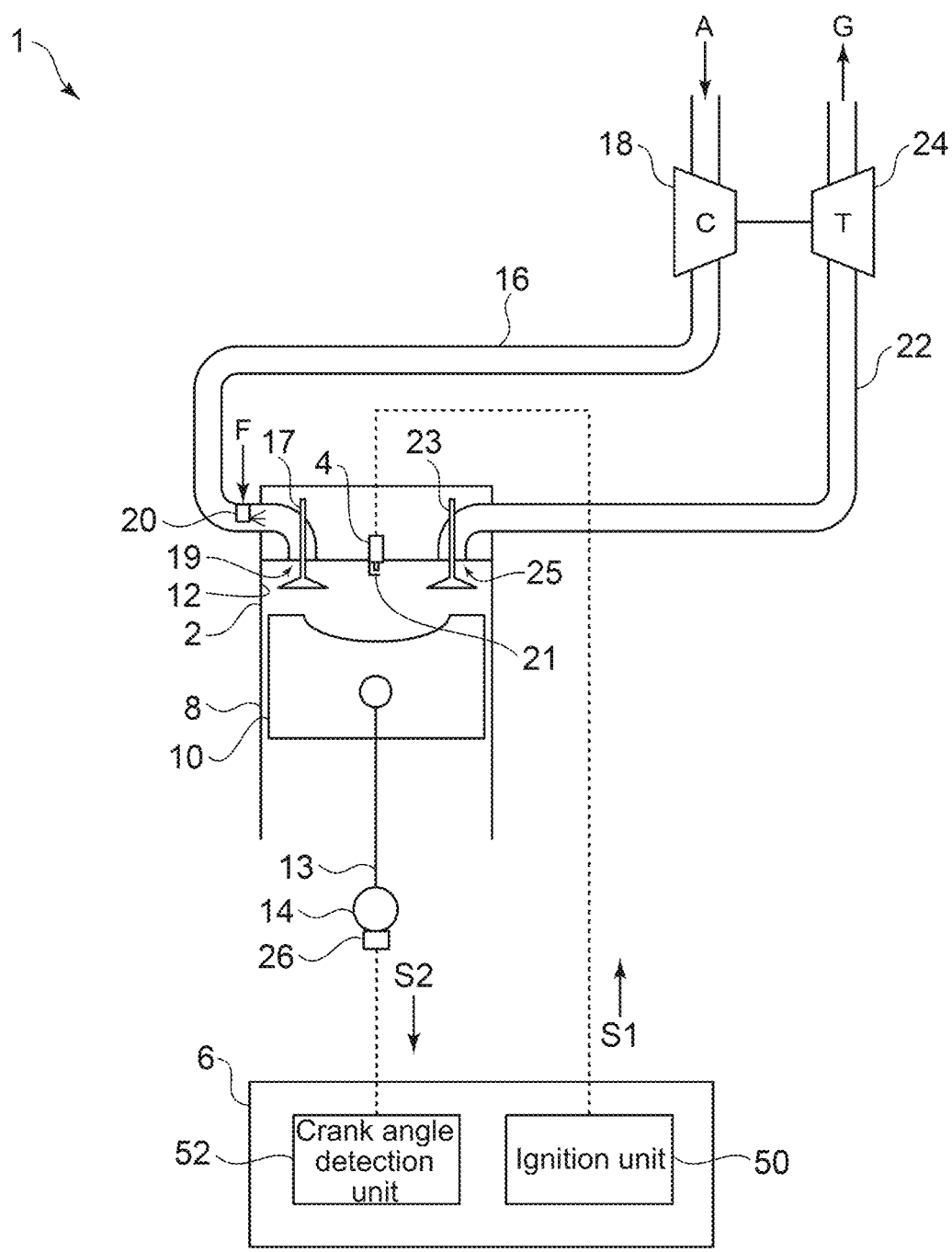
FIG. 1 is a view schematically showing the configuration of an internal combustion engine according to the first embodiment.

FIG. 1 is a view schematically showing the configuration of an internal combustion engine 1 according to the first embodiment. As illustrated in FIG. 1, the internal combustion engine 1 includes a combustion chamber 2 to which gas fuel F containing hydrogen is supplied, an ignition device 4 configured to ignite the gas fuel F within the combustion chamber 2, and a control device 6 for controlling execution of an ignition operation of the ignition device 4 at a predetermined ignition timing.

In the present disclosure, the "gas fuel F containing hydrogen" includes the gas fuel F containing hydrogen and fuel other than hydrogen (mixed combustion) and the gas fuel F containing only hydrogen (single combustion), and the gas fuel F containing hydrogen and the fuel other than hydrogen can further be classified into fuel containing hydrogen as a principal component (the volume fraction of hydrogen is at least 50%) and fuel containing the fuel other than hydrogen as a principal component (the volume fraction of hydrogen is less than 50%). The "gas fuel F containing hydrogen" includes all of these cases.

The combustion chamber 2 includes a cylindrical cylinder 8 and a piston 10 disposed inside the cylinder 8. The combustion chamber 2 is configured such that the gas fuel F is supplied to a main combustion chamber 12 defined by an inner surface of the cylinder 8 and an upper surface of the piston 10 The piston 10 is connected to a crankshaft 14 via a connecting rod 13, and reciprocating motion of the piston 10 is converted into rotation. The crankshaft 14 rotates twice during one combustion cycle C described later.

In the first embodiment, as illustrated in FIG. 1, the internal combustion engine 1 includes an intake passage 16 for sending air A to the combustion chamber 2, a compressor 18 for compressing the air A flowing through the intake passage 16, an exhaust passage 22 for discharging to outside the internal combustion engine 1 an exhaust gas G discharged from the combustion chamber 2, and a turbine 24 rotationally driven by the exhaust gas G flowing through the exhaust passage 22.

The intake passage 16 is open to the atmosphere at one end and open to the main combustion chamber 12 at another end. The air A flowing in from the one end of the intake passage 16 flows through the intake passage 16 toward the main combustion chamber 12. That is, the intake passage 16 is formed with an inlet where the air A flows in at the one end, and is formed with an outlet where the air A flows out at the another end. Hereinafter, the outlet of the intake passage 16 is referred to as an intake port 19. The intake passage 16 is provided with an intake valve 17 for opening and closing the intake port 19.

The exhaust passage 22 is open to the main combustion chamber 12 at one end and open to the atmosphere at another end. The exhaust gas G flowing in from the one end of the exhaust passage 22 flows through the exhaust passage 22 toward the another end (atmosphere) of the exhaust passage 22. That is, the exhaust passage 22 is formed with an inlet where the exhaust gas G flows in at the one end, and is formed with an outlet where the exhaust gas G flows out at the another end. Hereinafter, the inlet of the exhaust passage 22 is referred to as an exhaust port 25. The exhaust passage 22 is provided with an exhaust valve 23 for opening and closing the exhaust port 25.

In the embodiment illustrated in FIG. 1, the compressor 18 is disposed on the intake passage 16 and the turbine 24 is disposed on the exhaust passage 22. The compressor 18 and the turbine 24 are configured coaxially, and the turbine 24 is rotationally driven, causing the compressor 18 to compress the air A flowing through the intake passage 16.

In the embodiment illustrated in FIG. 1, the internal combustion engine 1 includes a gas fuel supply device 20 disposed on the intake passage 16 and configured to supply the gas fuel F to the intake passage 16. The gas fuel supply device 20 is located between the combustion chamber 2 and the compressor 18 on the intake passage 16. That is, the gas fuel supply device 20 mixes the gas fuel F with the air A compressed by the compressor 18. Thus, the internal combustion engine 1 according to the first embodiment adopts premixed combustion in which the air-fuel mixture of the air A and the gas fuel F is burned. In some embodiments, the internal combustion engine 1 is configured to burn an air-fuel mixture of the uncompressed air A (air at atmospheric pressure) and the gas fuel F.

In the embodiment illustrated in FIG. 1, the gas fuel supply device 20 is located between the compressor 18 and the intake valve 17 on the intake passage 16. Although not shown, in some embodiments, the internal combustion engine 1 includes an air cooler disposed between the compressor 18 and the combustion chamber 2 on the intake passage 16 and configured to cool the air A compressed by the compressor 18. In this case, the gas fuel supply device 20 is located between the air cooler and the combustion chamber 2 on the intake passage.

The ignition device 4 includes an ignition plug 21 disposed in the main combustion chamber 12, and ignites and burns the gas fuel F (air-fuel mixture) within the main combustion chamber 12 by discharging a spark from the ignition plug 21, generating a flame.

The control device 6 is a computer such as an electronic control device, and includes a processor such as CPU or GPU, a memory such as ROM or RAM, an I/O interface and the like (all of which are not shown). The processor executes operation (such as calculation) in accordance with a program instruction loaded to the memory, and whereby the control device 6 implements each functional unit of the control device 6.

In the embodiment illustrated in FIG. 1, the control device 6 includes an ignition unit 50 electrically connected to the ignition device 4. The ignition unit 50 transmits an ignition signal S1 to the ignition device 4. Upon receiving the ignition signal S1, the ignition device 4 ignites and burns the gas fuel F within the main combustion chamber 12 by discharging the spark from the ignition plug 21. Thus, the control device 6 can control the execution of the ignition operation of the ignition device 4 at a predetermined ignition timing by transmitting the ignition signal S1.

In the embodiment illustrated in FIG. 1, the internal combustion engine 1 includes an angle sensor 26 for detecting a rotation angle S2 of the crankshaft 14. The control device 6 includes a crank angle detection unit 52 electrically connected to the angle sensor 26. The crank angle detection unit 52 acquires the rotation angle S2 from the angle sensor 26 and converts it to a crank angle $\theta$ (0 degrees$\leq\theta\leq$720 degrees). The ignition unit 50 transmits the ignition signal S1 to the ignition device 4 at a timing when the crank angle detection unit 52 acquires the predetermined crank angle $\theta$. Then, the ignition device 4 executes the ignition operation simultaneously with the reception of the ignition signal S1 or immediately after the reception of the ignition signal S1.

Figure 2:
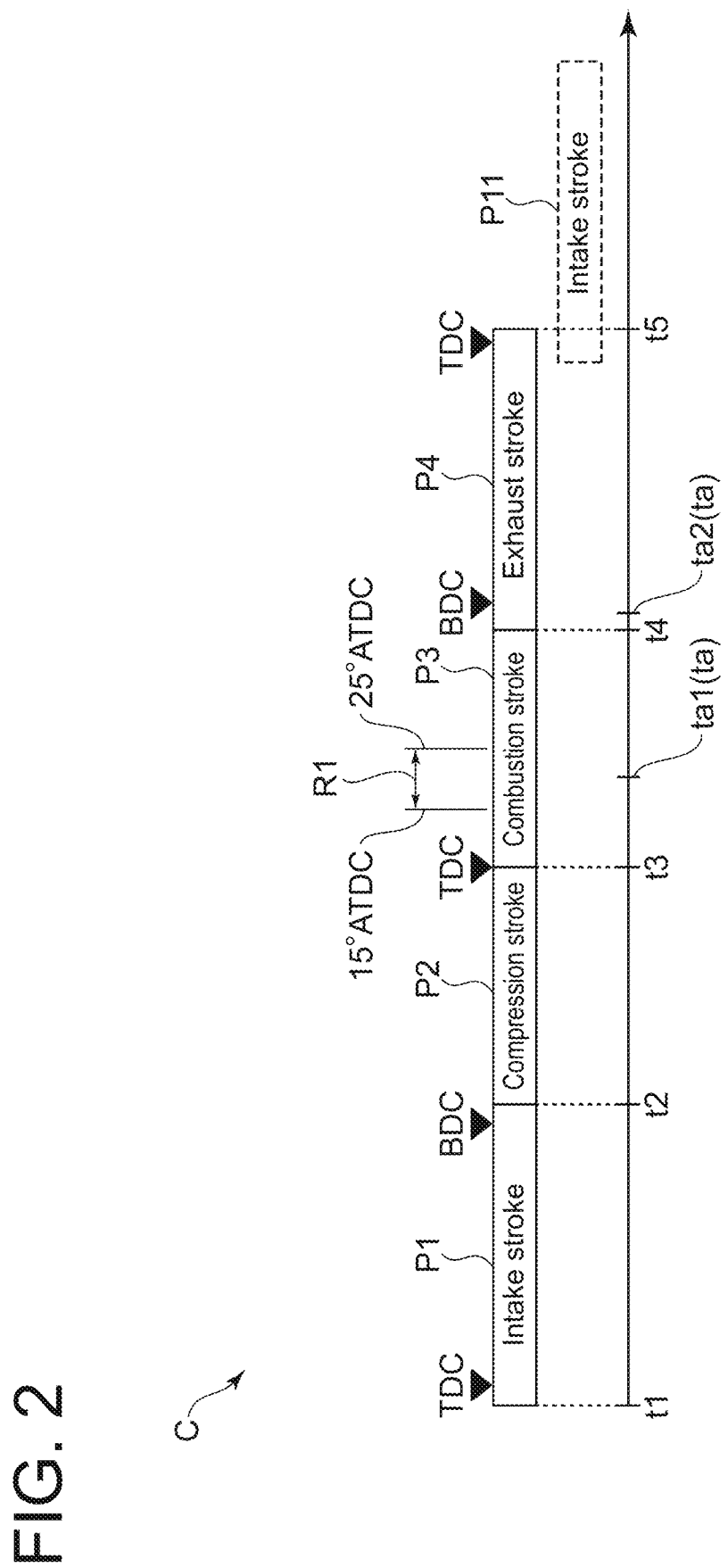
FIG. 2 is a view for describing a predetermined ignition timing of an ignition device according to the first embodiment.

The predetermined ignition timing of the ignition device 4 will be described. FIG. 2 is a view for describing the predetermined ignition timing of the ignition device 4 according to the first embodiment, and illustrates one combustion cycle C. As illustrated in FIG. 2, the one combustion cycle C includes an intake stroke P1, a compression stroke P2, a combustion stroke P3, and an exhaust stroke P4.

In the embodiment illustrated in FIG. 2, the one combustion cycle C is from the start of the intake stroke P1 and to the end of the exhaust stroke P4, and is executed in the order of the intake stroke P1, the compression stroke P2, the combustion stroke P3, and the exhaust stroke P4. FIG. 2 illustrates a timing at which the piston 10 reaches top dead center (TDC) and a timing at which the piston 10 reaches bottom dead center (BDC) in the one combustion cycle C. In the present disclosure, the crank angle $\theta$ when the piston 10 reaches top dead center (TDC) in the intake stroke P1 is set to 0 degrees. The crank angle $\theta$ increases as the one combustion cycle C advances from the intake stroke P1 to the exhaust stroke P4, and the crank angle $\theta$ when the piston 10 reaches top dead center (TDC) in the exhaust stroke P4 is set to 720 degrees.

In the intake stroke P1, the gas fuel F (air-fuel mixture) is drawn into the main combustion chamber 12. In the embodiment illustrated in FIG. 2, the intake stroke P1 starts at a timing t1 when the intake port 19 is opened, and ends at a timing t2 when the intake port 19 is closed. As the piston 10 moves from top dead center (TDC) toward bottom dead center (BDC) during the intake stroke P1, the air-fuel mixture is drawn into the main combustion chamber 12. Although the exhaust port 25 is closed during the intake stroke P1, the exhaust port 25 may be closed at the same time as the intake port 19 is opened, or may be closed after the intake port 19 is opened.

In the compression stroke P2, the air-fuel mixture in the main combustion chamber 12 is compressed. In the embodiment illustrated in FIG. 2, the compression stroke P2 starts at the above-described timing t2, and ends at a timing t3 when the piston 10 reaches the top dead center (so-called top dead center of compression). As the piston 10 moves from bottom dead center (BDC) toward top dead center (BDC), the air-fuel mixture within the main combustion chamber 12 is compressed.

In the combustion stroke P3, the air-fuel mixture compressed in the compression stroke P2 is burned. In the embodiment illustrated in FIG. 2, the combustion stroke P3 starts at the above-described timing t3. This timing t3 is the first-time ignition timing t3 of the one combustion cycle C, at which the ignition device 4 executes the ignition operation for the first time. That is, in the one combustion cycle C, the ignition unit 50 of the control device 6 first transmits the ignition signal S1 to the ignition device 4 at the timing when the crank angle detection unit 52 acquires the crank angle θ of 360 degrees. In the combustion stroke P3, the compressed air-fuel mixture is ignited by the spark from the ignition plug 21, and the combustion (expansion) of the air-fuel mixture pushes the piston 10 down toward bottom dead center (BDC). The combustion stroke P3 ends at a timing t4 when the exhaust port 25 is opened. The exhaust port 25 is opened before the piston 10 reaches the bottom dead center. That is, the timing t4 occurs before the piston 10 reaches the bottom dead center.

In the exhaust stroke P4, a product gas produced by the combustion of the air-fuel mixture is discharged as the exhaust gas G from the main combustion chamber 12. In the embodiment illustrated in FIG. 2, the exhaust stroke P4 starts at the above-described timing t4, and ends at a timing t5 when the exhaust port 25 is closed. As the piston 10 moves from bottom dead center (BDC) toward top dead center (BDC), the product gas within the main combustion chamber 12 is discharged as the exhaust gas G to the outside of the main combustion chamber 12. In the first embodiment, as illustrated in FIG. 2, part of the exhaust stroke P4 and part of an intake stroke P11 in a combustion cycle next to the one combustion cycle C overlap each other.

The predetermined ignition timing of the ignition device 4 includes a subsequent ignition timing ta in addition to the above-described first-time ignition timing t3. The subsequent ignition timing ta occurs subsequent to the first-time ignition timing t3 of the one combustion cycle C. In the first embodiment, as illustrated in FIG. 2, the subsequent ignition timing ta includes a first subsequent ignition timing ta1 (ta) and a second subsequent ignition timing ta2 (ta).

The first subsequent ignition timing ta1 is included in the combustion stroke P3 of the one combustion cycle C. In the first embodiment, the first subsequent ignition timing ta1 is included within a first range R1 from 15° ATDC to 25° ATDC. In other words, the first subsequent ignition timing ta1 is included in a period during which the crankshaft 14 rotates from 15 degrees to 25 degrees (the crank angle θ is from 375 degrees to 385 degrees) after the piston 10 reaches the second top dead center (top dead center of compression) in the one combustion cycle C. The ignition unit 50 of the control device 6 transmits the ignition signal S1 to the ignition device 4 at a timing (first subsequent ignition timing ta1) when the crank angle θ of 380 degrees is acquired, for example. Then, the ignition device 4 executes the ignition operation at the first subsequent ignition timing ta1. Hereinafter, the timing at which the crank angle θ is 380 degrees will be described as being the same as the first subsequent ignition timing ta1.

The second subsequent ignition timing ta2 is included in the exhaust stroke P4 of the one combustion cycle C. In the first embodiment, as illustrated in FIG. 2, the second subsequent ignition timing ta2 is immediately after the start of the exhaust stroke P4, and is included in a period from the timing t4 to when the piston 10 reaches the second bottom dead center (the crank angle θ is 540 degrees) in the one combustion cycle C, for example. The ignition unit 50 of the control device 6 transmits the ignition signal S1 to the ignition device 4 at a timing (second subsequent ignition timing ta2) when the crank angle θ of 535 degrees is acquired, for example. Then, the ignition device 4 executes the ignition operation at the second subsequent ignition timing ta2. Hereinafter, the timing at which the crank angle θ is 535 degrees will be described as being the same as the second subsequent ignition timing ta2.

(Operation/Effect)

An operation/effect of the internal combustion engine 1 according to the first embodiment will be described. Hydrogen has a higher combustion speed than a component contained in conventional gas fuel (such as methane contained in city gas or propane contained in LPG). Therefore, even the unburned gas fuel F discharged from the main combustion chamber 12 due to occurrence of a misfire in the one combustion cycle C may ignite in the exhaust passage 22 when the unburned gas fuel F comes into contact with the exhaust gas G discharged from the combustion cycle next to this one combustion cycle C. If the ignition occurs, a rapid pressure increase may damage the exhaust passage 22 or the turbine 24. Further, during the overlap period when part of the exhaust stroke P4 and part of the intake stroke P11 overlap, the flame may flow back to the intake passage 16, which may result in damage to the intake passage 16.

By contrast, according to the first embodiment, the ignition device 4 executes the ignition operation at each of the first subsequent ignition timing ta1 and the second subsequent ignition timing ta2 subsequent to the first-time ignition timing t3 of the one combustion cycle C, regardless of the presence or absence of the misfire. Thus, the air-fuel mixture (hydrogen) within the main combustion chamber 12 is burned regardless of the occurrence of the misfire in the one combustion cycle C, making it possible to suppress the damage to the intake passage 16 or the damage to the exhaust passage 22 due to the occurrence of the misfire (the ignition of hydrogen) in the one combustion cycle C.

According to the first embodiment, since the ignition device 4 executes the ignition operation at the first subsequent ignition timing ta1, the unburned gas fuel F which was not completely burned in the ignition operation at the first-time ignition timing t3 is burned in the combustion stroke P3 of the same one combustion cycle C, making it possible to suppress the amount of the unburned gas fuel F discharged from the main combustion chamber 12.

If the first subsequent ignition timing ta1 is before 15° ATDC (the crankshaft 14 rotates 15 degrees from the top dead center of compression), a pressure Pr within the cylinder 8 is not high enough, making it difficult to evaluate the presence or absence of the misfire. On the other hand, if the first subsequent ignition timing ta1 is after 25° ATDC (the crankshaft 14 rotates 25 degrees from the top dead center of compression), a time until the timing t4 at which the exhaust port 25 is opened is short, which may result in insufficient combustion of the unburned gas fuel F. According to the first embodiment, by setting the first subsequent ignition timing in the range from 15° ATDC to 25° ATDC, it is possible to suppress the generation of the unburned gas fuel F while facilitating the evaluation of the presence or absence of the misfire.

According to the first embodiment, since the ignition device 4 executes the ignition operation at the second subsequent ignition timing ta2, the unburned gas fuel F which was not completely burned in the ignition operation at the first-time ignition timing t3 or the ignition operation at the first subsequent ignition timing is burned in the exhaust stroke P4 in the same one combustion cycle C, making it possible to suppress the amount of the unburned gas fuel F discharged from the main combustion chamber 12.

In the first embodiment, the subsequent ignition timing ta includes both the first subsequent ignition timing ta1 and the second subsequent ignition timing ta2. However, the present disclosure is not limited to this form. In some embodiments, the subsequent ignition timing ta includes either the first subsequent ignition timing ta1 or the second subsequent ignition timing ta2.

In the first embodiment, the subsequent ignition timing ta includes the one first subsequent ignition timing ta1 and the one second subsequent ignition timing ta2. However, the present disclosure is not limited to this form. In some embodiments, the subsequent ignition timing ta includes a plurality of first subsequent ignition timings ta1. In some embodiments, the subsequent ignition timing ta includes a plurality of second subsequent ignition timings ta2.

Second Embodiment

The internal combustion engine 1 according to the second embodiment of the present disclosure will be described. The internal combustion engine 1 according to the second embodiment is obtained by adding a misfire detection device 28 to the internal combustion engine 1 according to the first embodiment. In the second embodiment, the same constituent elements as those in the first embodiment are associated with the same reference signs and not described again in detail.

(Configuration)

Figure 3:
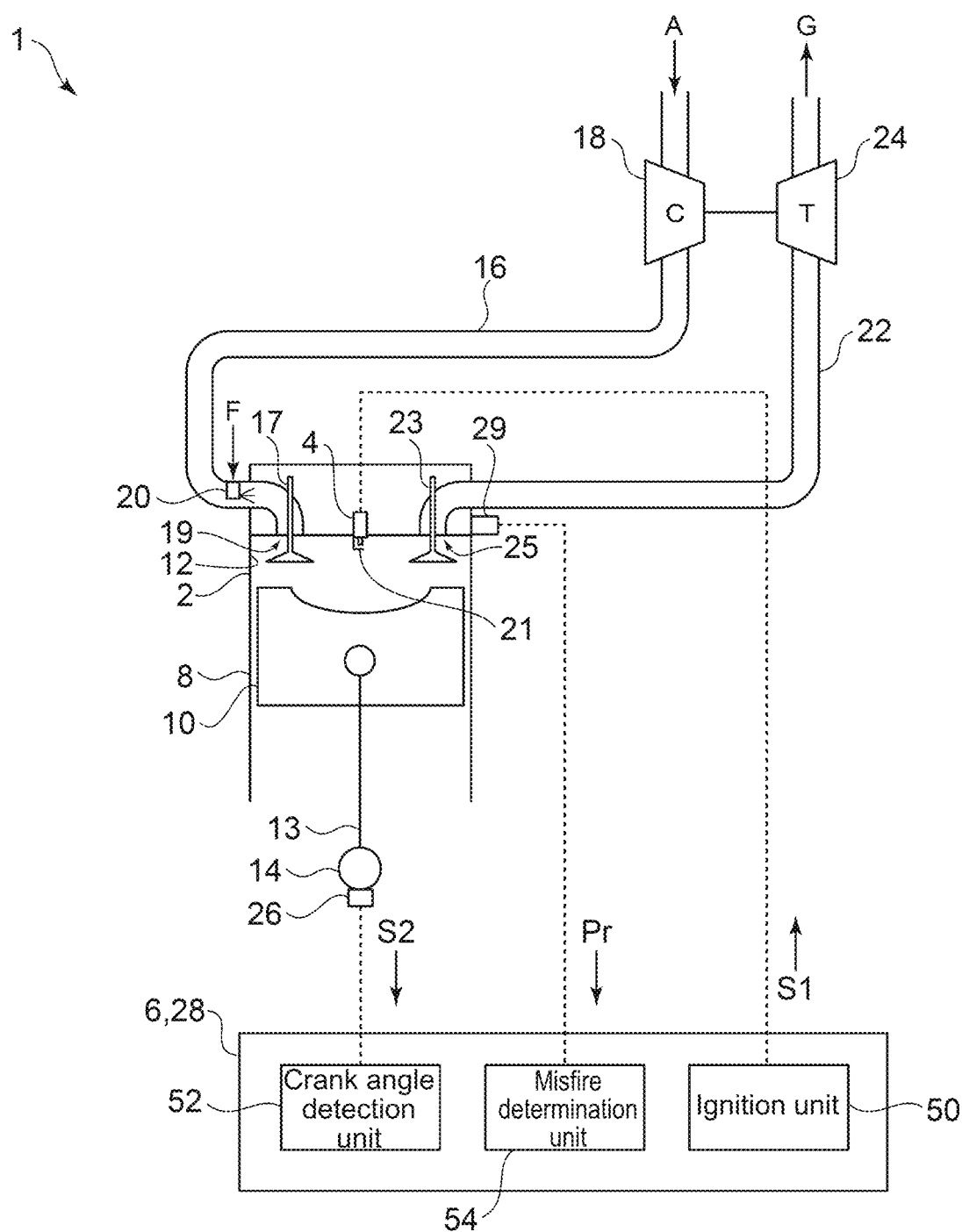
FIG. 3 is a view schematically showing the configuration of the internal combustion engine according to the second embodiment.

FIG. 3 is a view schematically showing the configuration of the internal combustion engine 1 according to the second embodiment. As illustrated in FIG. 3, the internal combustion engine 1 further includes the misfire detection device 28 for detecting the misfire within the combustion chamber 2 in the one combustion cycle C. The control device 6 is configured to execute the ignition operation of the ignition device 4 at the subsequent ignition timing ta, when the misfire detection device 28 detects the misfire within the combustion chamber 2. Further, the control device 6 is configured to stop the ignition operation of the ignition device 4 at the subsequent ignition timing ta, when the misfire detection device 28 does not detect the misfire within the combustion chamber 2.

In the second embodiment, the control device 6 includes the misfire detection device 28. The control device 6 and the misfire detection device 28 are configured integrally. In some embodiments, the control device 6 and the misfire detection device 28 are configured separately. The misfire detection device 28 (control device 6) further includes a misfire determination unit 54 electrically connected to a pressure sensor 29 capable of detecting the pressure Pr within the cylinder 8. The misfire determination unit 54 determines whether or not the misfire has occurred within the main combustion chamber 12, based on the pressure Pr acquired from the pressure sensor 29.

Figure 4:
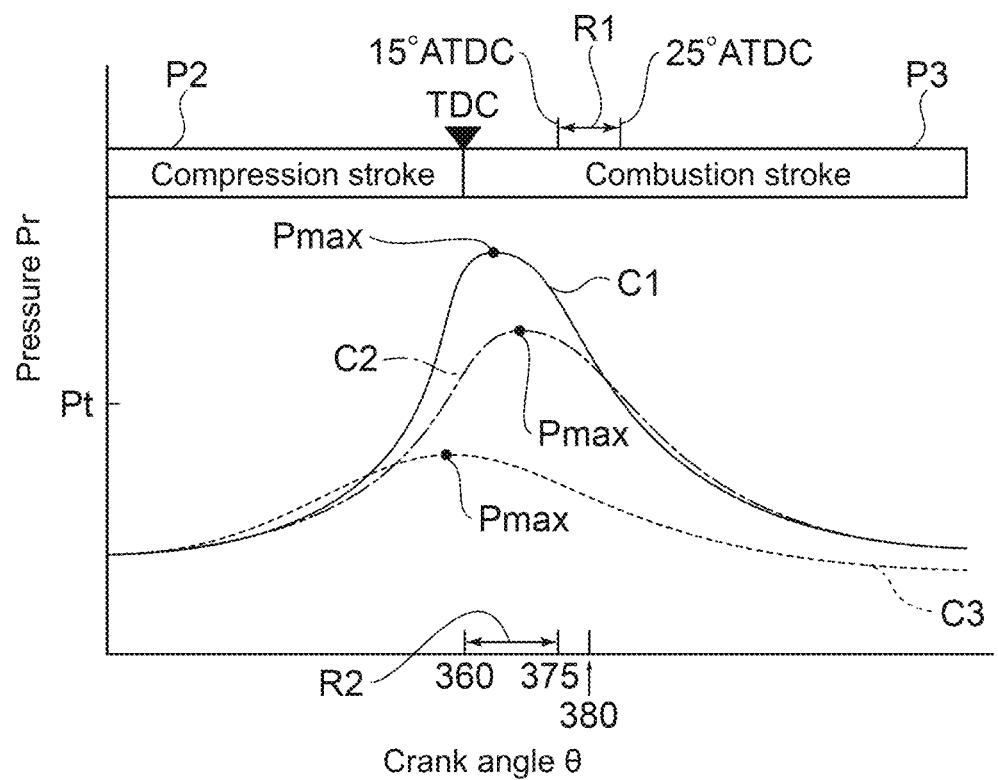
FIG. 4 is a graph showing a relationship between a pressure and a crank angle.

An example of a method for determining the misfire by the misfire determination unit 54 will be described. FIG. 4 is a graph showing a relationship between the pressure Pr and the crank angle θ. In the graph shown in FIG. 4, the horizontal axis represents the crank angle θ, and the vertical axis represents the pressure Pr. FIG. 4 illustrates the pressure Pr for each of three combustion cycles. A first combustion cycle C1 is illustrated with a solid line, a second combustion cycle C2 is illustrated with a dotted and dashed lines, and a third combustion cycle C3 is illustrated with a dotted line.

As illustrated in FIG. 4, a range in which the crank angle θ is not less than 360 degrees and not greater than 375 degrees is referred to as a second range R2. In other words, the second range R2 is a period during which the crankshaft 14 rotates 15 degrees from the second top dead center (top dead center of compression) in the one combustion cycle C. In some embodiments, the second range R2 is after the first-time ignition timing t3 and before the first subsequent ignition timing ta1 of the one combustion cycle C.

The misfire determination unit 54 determines that a misfire has occurred if a maximum pressure Pmax in the second range R2 is not greater than a preset threshold Pt, and determines that the misfire has not occurred if the maximum pressure Pmax exceeds the threshold Pt. In the case illustrated in FIG. 4, the misfire determination unit 54 determines that the misfire has not occurred with respect to the first combustion cycle C1 and the second combustion cycle C2, and determines that the misfire has occurred with respect to the third combustion cycle C3.

In the second embodiment, when the misfire determination unit 54 determines that the misfire has occurred, the ignition unit 50 of the control device 6 transmits the ignition signal S1 to the ignition device 4 at both the first subsequent ignition timing ta1 and the second subsequent ignition timing ta2 (the timing at which the crank angle θ is 380 degrees and the timing at which the crank angle θ is 535 degrees). Then, the ignition device 4 executes the ignition operation at both the first subsequent ignition timing ta1 and the second subsequent ignition timing ta2. In the case illustrated in FIG. 4, the ignition operation of the ignition device 4 at each of the first subsequent ignition timing ta1 and the second subsequent ignition timing ta2 is executed in the third combustion cycle C3.

In the second embodiment, when the misfire determination unit 54 does not determine that the misfire has occurred, the ignition unit 50 of the control device 6 does not transmit the ignition signal S1 to the ignition device 4 at both the first subsequent ignition timing ta1 and the second subsequent ignition timing ta2 (the timing at which the crank angle θ is 380 degrees and the timing at which the crank angle θ is 535 degrees). Therefore, the ignition device 4 does not execute the ignition operation at both the first subsequent ignition timing ta1 and the second subsequent ignition timing ta2. In the case illustrated in FIG. 4, the ignition operation of the ignition device 4 at each of the first subsequent ignition timing ta1 and the second subsequent ignition timing ta2 is stopped in both the first combustion cycle C1 and the second combustion cycle C2.

(Operation/Effect)

An operation/effect of the internal combustion engine 1 according to the second embodiment will be described. According to the second embodiment, the ignition operation of the ignition device 4 at each of the first subsequent ignition timing ta1 and the second subsequent ignition timing ta2 is not executed when the misfire detection device 28 does not detect the misfire within the main combustion chamber 12. Therefore, a product life of the ignition device 4 can be extended compared to the case where the ignition operation of the ignition device 4 at each of the first subsequent ignition timing ta1 and the second subsequent ignition timing ta2 is executed regardless of the presence or absence of the misfire.

As described above, since hydrogen has the high combustion speed, it is desirable to suppress the amount of even the unburned gas fuel F discharged from the main combustion chamber 12 to the exhaust passage 22 in the one combustion cycle C. According to the second embodiment, when the misfire determination is made during the one combustion cycle C and it is determined that the misfire has occurred, the ignition operation of the ignition device 4 is executed at each of the first subsequent ignition timing ta1 and the second subsequent ignition timing ta2 in this one combustion cycle. Therefore, it is possible to suppress the amount of the unburned gas fuel F discharged to the exhaust passage 22 in the one combustion cycle C.

In the second embodiment, the misfire detection device 28 detects the misfire based on whether the maximum pressure Pmax exceeds the threshold Pt. However, the present disclosure is not limited to this form. In some embodiments, the misfire detection device 28 is configured to determine that the misfire has occurred if a pressure difference between two timings at which the position of the piston 10 is common to each other is not greater than a preset threshold. For example, the misfire detection device is configured to determine that the misfire has occurred if the difference between the pressure Pr at −20° ATDC and the pressure Pr at 20° ATDC is not greater than the threshold.

In the second embodiment, the misfire detection device 28 detects the misfire based on the pressure Pr within the cylinder 8. However, the present disclosure is not limited to this form. The misfire detection device 28 may detect the misfire based on a detection value (for example, an engine vibration, a rotation speed or torque of the crankshaft, an exhaust gas component, etc.) other than the pressure Pr within the cylinder 8.

Third Embodiment

The internal combustion engine 1 according to the third embodiment of the present disclosure will be described. The internal combustion engine 1 according to the third embodiment is obtained by adding a hydrogen combustion device 30 to the internal combustion engine 1 according to the second embodiment. In the third embodiment, the same constituent elements as those in the second embodiment are associated with the same reference signs and not described again in detail. The internal combustion engine 1 according to some embodiments is obtained by adding the hydrogen combustion device 30 to the internal combustion engine 1 according to the first embodiment.
(Configuration)

Figure 5:
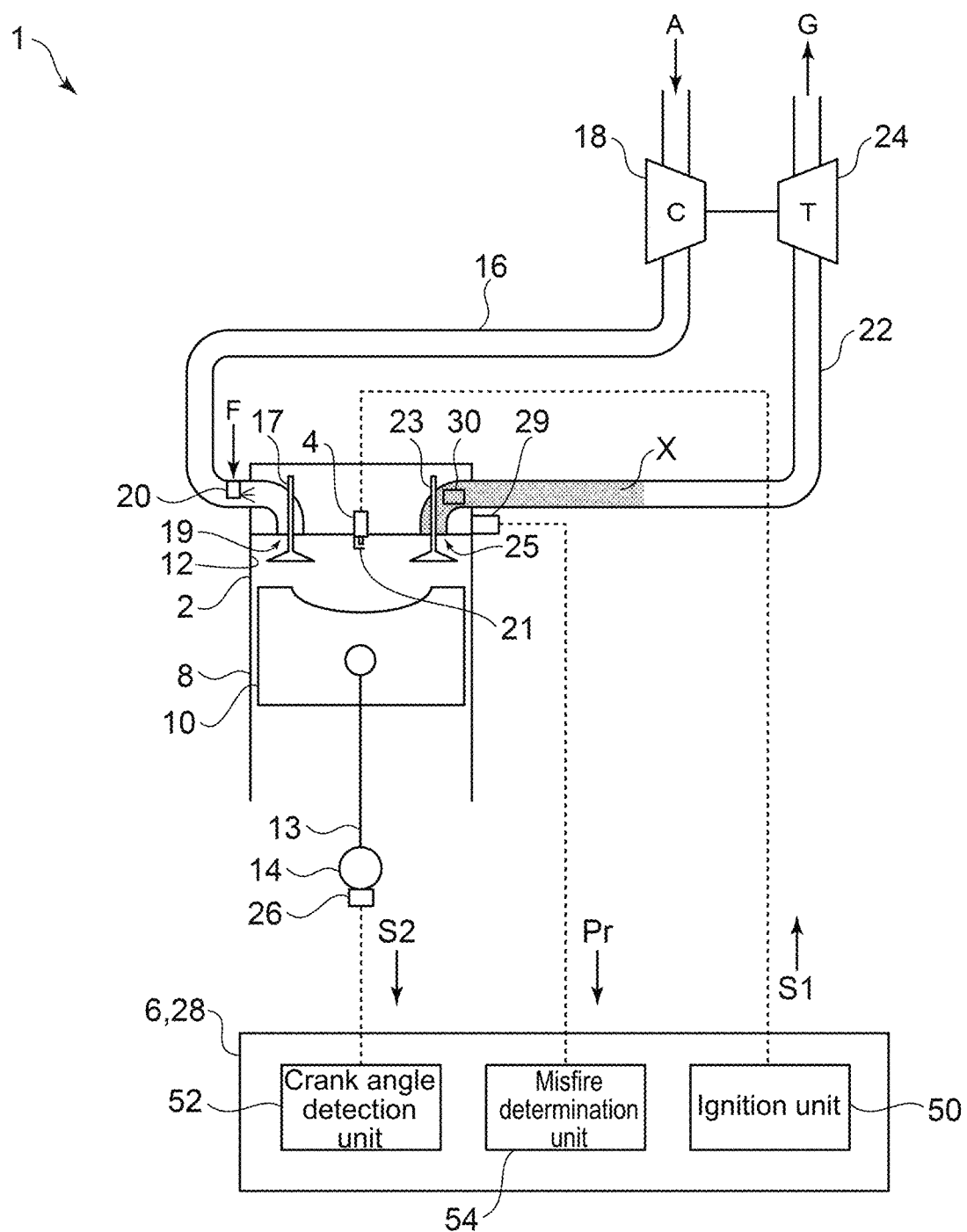
FIG. 5 is a view schematically showing the configuration of the internal combustion engine according to the third embodiment.

FIG. 5 is a view schematically showing the configuration of the internal combustion engine 1 according to the third embodiment. As illustrated in FIG. 5, the internal combustion engine 1 further includes the hydrogen combustion device 30 disposed on the exhaust passage 22 and configured to burn hydrogen contained in the gas fuel F.

In the third embodiment, the hydrogen combustion device 30 is a ceramic body containing a ceramic. The hydrogen combustion device 30 is disposed on a side (exhaust port 25 side) closer to the inlet than the outlet of the exhaust passage 22. The hydrogen combustion device 30 is disposed between the combustion chamber 2 and the turbine 24 on the exhaust passage 22. More specifically, as illustrated in FIG. 5, the hydrogen combustion device 30 is disposed inside a region X of the exhaust passage 22, where the exhaust gas G reaches which is discharged from the main combustion chamber 12 in the exhaust stroke P4 of the one combustion cycle C. In some embodiments, the hydrogen combustion device 30 is disposed inside the region X where the exhaust gas G during the misfire reaches, and is capable of burning hydrogen contained in the exhaust gas G during the misfire in the one combustion cycle C.
(Operation/Effect)

According to the third embodiment, even if the unburned gas fuel F is discharged from the main combustion chamber 12 to the exhaust passage 22, hydrogen contained in the unburned gas fuel F is burned by the hydrogen combustion device 30. Therefore, it is possible to suppress accumulation of hydrogen in the exhaust passage 22 and to prevent a problem caused by the ignition of the accumulated hydrogen.

If the hydrogen combustion device 30 is disposed outside the region X of the exhaust passage 22, it is impossible to burn hydrogen contained in the unburned gas fuel F discharged from the exhaust stroke P4 in the one combustion cycle C, and the concentration of the hydrogen accumulated in the exhaust passage 22 increases, increasing the possibility of the ignition. However, according to the third embodiment, since the hydrogen combustion device 30 is disposed inside the region X of the exhaust passage 22, it is possible to burn hydrogen contained in the unburned gas fuel F discharged from the exhaust stroke P4 in the one combustion cycle C.

According to the third embodiment, since the hydrogen combustion device 30 is the ceramic body, by disposing the ceramic body on the exhaust passage 22, the exhaust gas G discharged from the main combustion chamber 12 raises a temperature of the ceramic body, allowing the ceramic body to burn hydrogen. In this manner, the internal combustion engine 1 can be provided with the hydrogen combustion device 30 having the simple configuration. In the third embodiment, the hydrogen combustion device 30 is the ceramic body. However, the present disclosure is not limited to this form. The hydrogen combustion device 30 may be a glow plug or a burner.

In the first to third embodiments, the internal combustion engine 1 controls the execution of the ignition operation of the ignition device 4 at the predetermined ignition timing by the control device 6, thereby suppressing the amount of the unburned gas fuel F discharged to the exhaust passage 22 and suppressing the damage due to the occurrence of the misfire in the one combustion cycle. However, the present disclosure is not limited to this form.

In some embodiments, the internal combustion engine 1 includes the combustion chamber 2 to which the gas fuel F containing hydrogen is supplied, the exhaust passage 22 through which the exhaust gas G discharged from the combustion chamber 2 flows, and the hydrogen combustion device 30 disposed on the exhaust passage 22 and configured to burn hydrogen contained in the gas fuel F. According to such configuration, since the hydrogen combustion device 30 is disposed on the exhaust passage 22, even if the misfire occurs and the unburned gas fuel F is discharged to the exhaust passage 22, it is possible to burn hydrogen contained in the unburned gas fuel F. Therefore, it is possible to suppress the damage due to the occurrence of the misfire in the one combustion cycle of the internal combustion engine 1 adopting the gas fuel F containing hydrogen.

The contents described in the above embodiments would be understood as follows, for instance.

[1] An internal combustion engine (1) according to the present disclosure, includes: a combustion chamber (2) to which a gas fuel (F) containing hydrogen is supplied; an ignition device (4) configured to ignite the gas fuel within the combustion chamber; and a control device (6) for controlling execution of an ignition operation of the ignition device at a predetermined ignition timing. The predetermined ignition timing includes a first-time ignition timing (t3) of one combustion cycle (C), at which the ignition operation is executed for a first time, and a subsequent ignition timing (ta) of the one combustion cycle, at which the ignition operation is executed subsequent to the first-time ignition timing.

According to the configuration as defined in the above [1], the gas fuel containing hydrogen is supplied to the combustion chamber. Then, the ignition device executes the ignition operation also at the subsequent ignition timing subsequent to the first-time ignition timing of the one combustion cycle, at which the ignition operation is executed for the first time, regardless of the presence or absence of a misfire. Therefore, hydrogen contained in the gas fuel within the combustion chamber is burned regardless of the occurrence of the misfire in the one combustion cycle, making it possible to suppress the damage due to the occurrence of the misfire (the ignition of hydrogen) in the one combustion cycle C.

[2] In some embodiments, in the configuration as defined in the above [1], the subsequent ignition timing includes a first subsequent ignition timing (ta1) at which the ignition operation is executed in a combustion stroke (P3) of the one combustion cycle.

According to the configuration as defined in the above [2], the unburned gas fuel which was not completely burned in the ignition operation of the ignition device at the first-time ignition timing is burned in the combustion stroke of the same one combustion cycle, making it possible to suppress the amount of the unburned gas fuel discharged from the combustion chamber.

[3] In some embodiments, in the configuration as defined in the above [2], the first subsequent ignition timing is within a range (R1) from 15° ATDC to 25° ATDC.

If the first subsequent ignition timing is before 15° ATDC, a pressure within the combustion chamber is not high enough, making it difficult to evaluate the presence or absence of the misfire. On the other hand, if the first subsequent ignition timing is after 25° ATDC, a time until the exhaust stroke starts is short, which may result in insufficient combustion of the unburned fuel. According to the configuration as defined in the above [3], by setting the first subsequent ignition timing in the range from 15° ATDC to 25° ATDC, it is possible to suppress the generation of the unburned fuel while facilitating the evaluation of the presence or absence of the misfire.

[4] In some embodiments, in the configuration as defined in any one of the above [1] to [3], the subsequent ignition timing includes a second subsequent ignition timing (ta2) at which the ignition operation is executed in an exhaust stroke (P4) of the one combustion cycle.

According to the configuration as defined in the above [4], the unburned gas fuel which was not completely burned in the ignition operation of the ignition device at the first-time ignition timing is burned in the exhaust stroke of the same one combustion cycle, making it possible to suppress the amount of the unburned gas fuel discharged from the combustion chamber.

[5] In some embodiments, in the configuration as defined in any one of the above [1] to [4], the internal combustion engine further includes a misfire detection device (28) for detecting a misfire within the combustion chamber in the one combustion cycle. The control device is configured to: execute the ignition operation of the ignition device at the subsequent ignition timing, when the misfire detection device detects the misfire within the combustion chamber; and stop the ignition operation of the ignition device at the subsequent ignition timing, when the misfire detection device does not detect the misfire within the combustion chamber.

According to the configuration as defined in the above [5], since the ignition operation of the ignition device at the subsequent ignition timing is not executed when the misfire detection device does not detect the misfire within the combustion chamber, a product life of the ignition device can be extended compared to the case where the ignition operation at the subsequent ignition timing is executed regardless of the presence or absence of the misfire.

[6] In some embodiments, in the configuration as defined in the above [5], the misfire detection device is configured to determine that the misfire has occurred, if a maximum pressure (Pmax) within the combustion chamber after the first-time ignition timing and before the subsequent ignition timing of the one combustion cycle is not greater than a predetermined pressure (Pt).

Since hydrogen has the high combustion speed, it is desirable to suppress the amount of even the unburned gas fuel discharged from the combustion chamber in the one combustion cycle. According to the configuration as defined in the above [6], when the misfire determination is made during the one combustion cycle and it is determined that the misfire has occurred, the ignition operation is executed at the subsequent ignition timing of this one combustion cycle. Therefore, it is possible to suppress the amount of the unburned gas fuel discharged from the combustion chamber in the one combustion cycle.

[7] In some embodiments, in the configuration as defined in any one of the above [1] to [6], the internal combustion engine further includes a hydrogen combustion device (30) for burning hydrogen contained in the gas fuel. The hydrogen combustion device is disposed on an exhaust passage (22) through which an exhaust gas discharged from the combustion chamber flows.

According to the configuration as defined in the above [7], even if the unburned gas fuel is discharged from the combustion chamber to the exhaust passage, hydrogen contained in the unburned gas fuel is burned by the hydrogen combustion device. Therefore, it is possible to suppress accumulation of hydrogen in the exhaust passage and to prevent a problem caused by the ignition of the accumulated hydrogen.

[8] In some embodiments, in the configuration as defined in the above [7], the hydrogen combustion device is disposed in a region (X) of the exhaust passage, where the exhaust gas (G) reaches which is discharged from the combustion chamber in an exhaust stroke of the one combustion cycle.

According to the configuration as defined in the above [8], it is possible to burn hydrogen contained in the unburned gas fuel in the one combustion cycle.

[9] In some embodiments, in the configuration as defined in the above [7] or [8], the hydrogen combustion device is a ceramic body containing a ceramic.

By disposing the ceramic body on the exhaust passage, the exhaust gas discharged from the combustion chamber and flowing through the exhaust passage raises a temperature of the ceramic body, allowing the ceramic body to burn hydrogen. According to the configuration as defined in the above [9], it is possible to provide the hydrogen combustion device having the simple configuration.

An internal combustion engine according to the present disclosure, includes: a combustion chamber to which a gas fuel containing hydrogen is supplied; an exhaust passage through which an exhaust gas discharged from the combustion chamber flows; and a hydrogen combustion device disposed on the exhaust passage and configured to burn the hydrogen contained in the gas fuel.

According to the configuration as defined in the above [10], since the hydrogen combustion device is disposed on the exhaust passage, even if the misfire occurs and the unburned gas fuel is discharged to the exhaust passage, it is possible to burn hydrogen contained in the unburned gas fuel. Therefore, it is possible to suppress the damage due to the misfire in the one combustion cycle of the internal combustion engine adopting the gas fuel containing hydrogen.

REFERENCE SIGNS LIST

1 Internal combustion engine
2 Combustion chamber
4 Ignition device
6 Control device
8 Cylinder
10 Piston
12 Main combustion chamber
13 Connecting rod
14 Crankshaft
16 Intake passage
17 Intake valve
18 Compressor
19 Intake port
20 Gas fuel supply device
21 Ignition plug
22 Exhaust passage
23 Exhaust valve
24 Turbine
25 Exhaust port
26 Angle sensor
28 Misfire detection device
29 Pressure sensor
30 Hydrogen combustion device
50 Ignition unit
52 Crank angle detection unit
54 Misfire determination unit
A Air
C One combustion cycle
F Gas fuel
G Exhaust gas
P1 Intake stroke
P2 Compression stroke
P3 Combustion stroke
P4 Exhaust stroke
Pr Pressure
Pmax Maximum pressure
Pt Threshold
R1 First range
R2 Second range
S1 Ignition signal
S2 Rotation angle
X Region
t3 First-time ignition timing
ta Subsequent ignition timing
ta1 First subsequent ignition timing
ta2 Second subsequent ignition timing

The invention claimed is:

1. An internal combustion engine, comprising:
a combustion chamber to which a gas fuel containing hydrogen is supplied;
an ignition device configured to ignite the gas fuel within the combustion chamber;
a control device for controlling execution of an ignition operation of the ignition device at a predetermined ignition timing; and
a misfire detection device for detecting a misfire within the combustion chamber in the one combustion cycle,
wherein the predetermined ignition timing includes a first-time ignition timing of one combustion cycle, at which the ignition operation is executed for a first time, and a subsequent ignition timing of the one combustion cycle, at which the ignition operation is executed subsequent to the first-time ignition timing,
wherein the control device is configured to:
execute the ignition operation of the ignition device at the subsequent ignition timing, when the misfire detection device detects the misfire within the combustion chamber; and
stop the ignition operation of the ignition device at the subsequent ignition timing, when the misfire detection device does not detect the misfire within the combustion chamber, and
wherein the misfire detection device is configured to determine that the misfire has occurred, if a maximum pressure within the combustion chamber after the first-time ignition timing and before the subsequent ignition timing of the one combustion cycle is not greater than a predetermined pressure.

2. The internal combustion engine according to claim 1, wherein the subsequent ignition timing includes a first subsequent ignition timing at which the ignition operation is executed in a combustion stroke of the one combustion cycle.

3. The internal combustion engine according to claim 2, wherein the first subsequent ignition timing is within a range from 15° ATDC to 25° ATDC.

4. The internal combustion engine according to claim 1, wherein the subsequent ignition timing includes a second subsequent ignition timing at which the ignition operation is executed in an exhaust stroke of the one combustion cycle.

5. The internal combustion engine according to claim 1, further comprising a hydrogen combustion device for burning hydrogen contained in the gas fuel,
wherein the hydrogen combustion device is disposed on an exhaust passage through which an exhaust gas discharged from the combustion chamber flows.

6. The internal combustion engine according to claim 5, wherein the hydrogen combustion device is disposed in a region of the exhaust passage, where the exhaust gas reaches which is discharged from the combustion chamber in an exhaust stroke of the one combustion cycle.

7. The internal combustion engine according to claim 5, wherein the hydrogen combustion device is a ceramic body containing a ceramic.

* * * * *